March 25, 1952 M. S. McVAY ET AL 2,590,114
CATHODE-RAY INDICATOR
Original Filed May 4, 1942
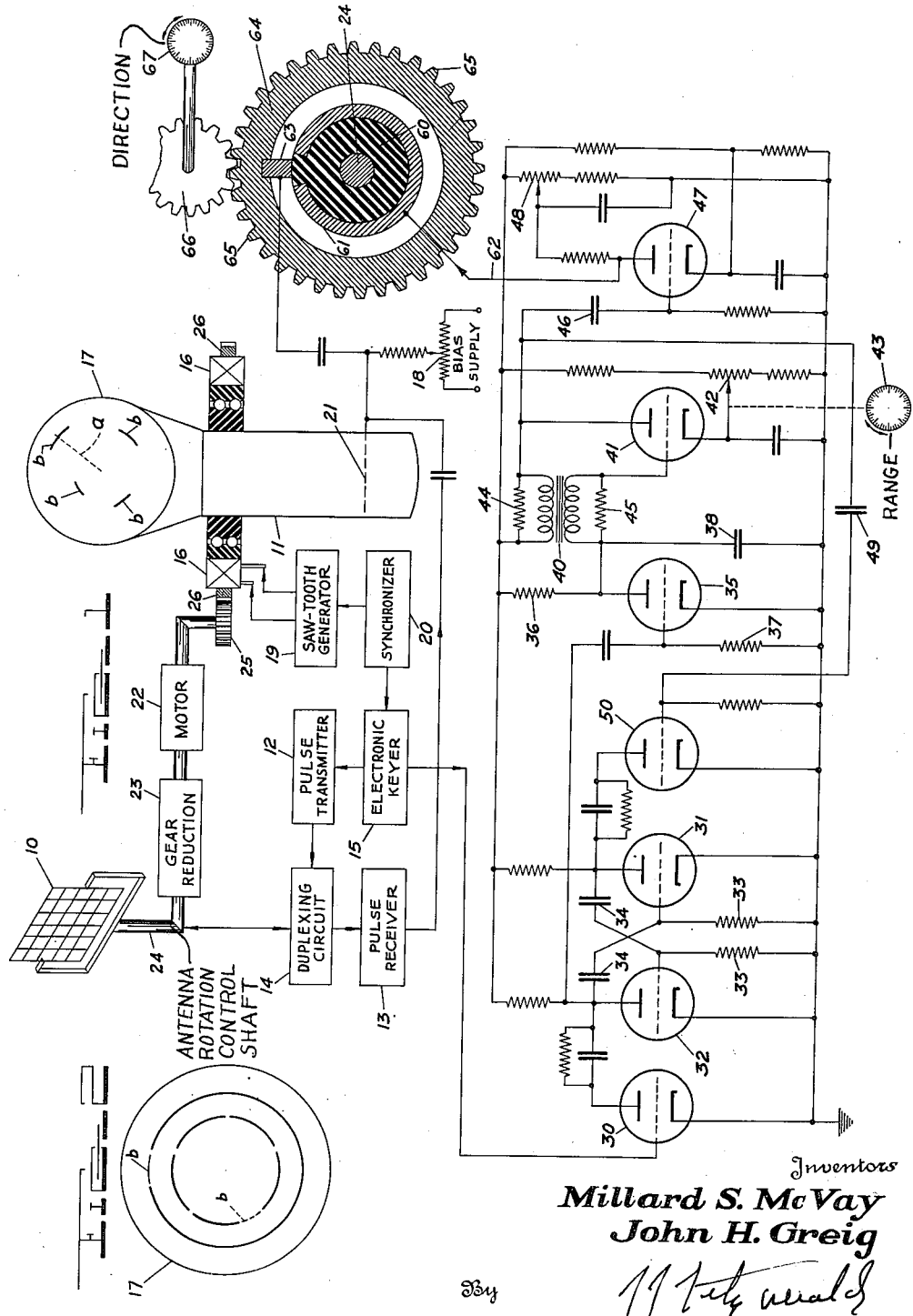
Inventors
Millard S. McVay
John H. Greig Patented Mar. 25, 1952

2,590,114

UNITED STATES PATENT OFFICE 2,590,114

CATHODE-RAY INDICATOR

Millard S. McVay, Washington, D. C., and
John H. Greig, New York, N. Y.

Continuation of application Serial No. 441,732,
May 4, 1942. This application December 26,
1947, Serial No. 794,074

8 Claims. (Cl. 315—24)

(Granted under the act of March 3, 1883, as
amended April 30, 1928; 370 O. G. 757)

This invention relates to indicating systems and more particularly to means for facilitating the interpretation of indications produced by radio echo ranging devices or similar apparatuses.

Certain radio echo ranging apparatuses include means for detecting the presence of all remote objects included within a field extending 360° about the apparatus, means for determining the range and direction of the detected objects with respect to the apparatus, and suitable indicating means, such as a cathode ray oscillograph, for providing a visual plan representation of the area extending 360° about the apparatus upon which indications of the detected remote objects are produced in such a manner to simultaneously show range and direction thereof.

More particularly, the foregoing types of radio echo ranging apparatus include a directional beam antenna supplied with a source of energy for producing a highly directional beam of energy. The antenna is continually rotated in order to scan an area 360° about the apparatus with such directional energy whereby the energy is reflected from all objects included within the scanned area. Such apparatuses further include means for producing a radial sweep on the cathode ray oscillograph which rotates in synchronism with rotation of the directional beam antenna so that the radial sweep at all times radially propagates in a direction which corresponds to the direction of the source of energy from the antenna. Means are also provided for receiving reflections of the energy from remote objects and for modulating the intensity of the sweep line on the oscillograph whenever reflected energy is received. By proper synchronization of the rate of emission of the directive energy with the rate of propagation of the radial sweep the positions of reflected energy indications on the sweep lines are a direct measurement of range of remote objects, while the angular position of the sweep line at the instant indications appear thereon represents the direction of remote objects. In operation of an apparatus of the above type, the intensity of the radial sweep is modulated in such a manner that only reflected energy indications, which appear as small arcs, the length of which varies with the range, are only visible on the oscillograph screen. With an indication of the foregoing type it becomes extremely difficult to accurately determine the range and direction of remote objects since reference indications of range and direction are not provided.

It is therefore an object of the present invention to provide novel means for facilitating the interpretation of indications produced by certain radio echo ranging devices or similar apparatuses.

Another object is to provide a radio echo ranging apparatus having novel indicating means whereby range and direction of remote objects are quickly obtained with a high degree of accuracy.

Still another object of the invention is to provide novel means for facilitating the determination of range and direction of a pre-selected remote object with a high degree of accuracy.

Still another object is to provide a discontinuous circular mark on the oscillograph screen with means for varying the radius of the mark as a function of range and the angular position of the discontinuous portion of the mark as a function of direction.

Still another object is to provide an indication of the foregoing character with novel means for indicating the radius of the circular mark and the angular position of the discontinuous portion thereof respectively as functions of range and direction.

Other objects and features of the invention will appear more fully from the following detailed description when considered in connection with the accompanying drawing which discloses one embodiment of the invention. It is to be expressly understood, however, that the drawing is designed for purposes of illustration only and not as a definition of the limits of the invention, reference for the latter purpose being had to the appended claims.

In the drawing, wherein similar reference characters denote similar elements throughout the several views:

Fig. 1 is a diagrammatic showing of a radio echo ranging apparatus embodying the principles of the present invention, and Fig. 2 is an illustration of the calibrating mark produced on viewing screen of the oscillograph disclosed in Fig. 1.

With reference more particularly to Fig. 1, a radio echo ranging apparatus is disclosed therein including a rotatable directional beam antenna 10, a cathode ray oscillograph 11, a radio frequency pulse transmitter 12 and a radio frequency pulse receiver 13. Transmitter 12 and receiver 13 are connected to antenna 10 through duplexing circuit 14. The duplexing circuit automatically functions to form an individual connection between transmitter 12 and antenna 10 and an individual connection between the antenna and receiver 13 so that a single antenna may be employed for transmission as well as reception. A duplexing circuit constructed in accordance with the principles disclosed in the patent to Wolff, # 2,401,717, and in the application of Leo C. Young and Robert M. Page for Impedance Coupling and Decoupling System, Serial No. 326,640, filed March 29, 1940, adequately serves this purpose. Antenna 10 may take the form of any directional beam antenna capable of producing a highly directive beam of energy, while transmitter 12 and receiver 13 are constructed in such a manner to properly transmit and receive radio pulses, the types of transmitters and receivers employed in conventional television systems are suitable for these purposes. Operation of transmitter 12 is controlled by electronic keyer 15 in such a manner that equally spaced radio pulses are emitted therefrom at a predetermined rate. Oscillograph 11 is provided with electro-magnetic deflection coils 16 mounted on anti-friction bearings for rotation about the oscillograph. Deflection coils 16 are wound in such a manner to produce varying magnetic lines of force within the oscillograph, when saw-tooth varying current is applied thereto, with a source of direct current, for deflecting the beam of electrons generated within the oscillograph in a radial direction from the center of the oscillograph, upon application of each saw-tooth wave form. Such deflection of the electron beam produces a radial sweep or trace $a$ on viewing screen 17 of oscillograph 11. By proper adjustment of bias supply 18 the intensity of the electron beam is normally modulated so that the radial sweep $a$ is not visible. Saw-tooth wave generator 19 is provided for applying saw-tooth wave forms, as well as a source of direct current, to deflection coils 16 through suitable slip rings. Synchronizer 20 is employed, with connections to electronic keyer 15 and saw-tooth wave generator 19, in order to properly synchronize the pulses emitted for transmitter 12 with the application of saw-tooth wave forms to deflection coils 16. Antenna 10 is continuously rotated by means of motor 22, the latter being rotatably connected to the antenna through gear reduction means 23 and shaft 24. In order to rotate the radial sweep $a$ in synchronism with rotation of antenna 10, deflection coils 16 are rotated by motor 22, through pinion 25, and annular gear 26 mounted on the outer periphery of the deflection coils. The arrangement is such that the energy emission from antenna 10 and the radial propagation of the electrical beam are at all times in the same direction. Whenever radio pulses emitted from antenna 10 impinge upon remote objects, echo pulses are reflected from the objects, passed to receiver 13 wherein such echo pulses are suitably amplified and subsequently applied to intensity control grid 21 to modulate the intensity of the electron beam thus producing visual indication on screen 17.

In operation of the radio echo ranging apparatus disclosed in Fig. 1, motor 22 continually rotates antenna 10 and deflection coils 16 in synchronism. The highly directive beam of energy from antenna 10, which comprises radio pulses propagating at a constant rate, is thus continually scanned over an area extending 360° about the antenna. The application of saw-tooth varying current from generator 19 to deflection coils 16 produces a radial sweep line $a$ on viewing screen 17, of oscillograph 11, which rotates in synchronism with rotation of the directive beam of energy emitted from the antenna. Synchronizer 20 controls operation of electronic keyer 15 and saw-tooth wave generator 19 in such a manner that a radio pulse is emitted from transmitter 12 simultaneously with application of every saw-tooth wave form to deflection coils 16. Whenever radio pulses emitted from the antenna impinge upon remote objects, echo pulses are reflected from the objects, received at antenna 10 and passed through a channel of duplexing circuit 14 to receiver 13. The echo pulses are properly amplified by receiver 13 and applied to intensity control grid 21 of the oscillograph to modulate the intensity of the electron beam thereof thus producing an indication on oscillograph screen 17. Due to operation of synchronizer 20, such pulse indications appear at various distances from the center of the oscillograph screen 17 in direction proportion to the range of remote objects, from which echo pulses are reflected, with respect to antenna 10. Since antenna 10 and sweep line $a$ rotate in synchronism, echo pulse indications from remote objects appear on oscillograph 17 at various angular positions that correspond to the angular position of remote objects with respect to antenna 10.

The foregoing type of radio echo ranging apparatus thus provides a visual plan indication of the area continually scanned by the highly directive source of energy emitted from antenna 10, which, in the present instance, comprises the viewing screen 17 of the oscillograph. Indications of remote objects are produced on viewing screen 17 in such a manner that range and direction of all remote objects included within the field scanned by the directive beam of energy from the antenna are simultaneously shown. In Fig. 1, indications of remote objects, designated by $b$, are shown on viewing screen 17, at various radial distances from the center of the oscillograph screen and at different angular positions thereon. Indications $b$ represent positions of remote objects with respect to antenna 10; the angular positions of the indications, with respect to the center of viewing screen 17, represent directions of such remote objects with respect to antenna 10, while the radial distance of the indications from the center of screen 17 correspond to the range of remote objects with respect to the antenna. As mentioned heretofore, bias supply 19 is adjusted in such a manner as to modulate the intensity of the electron beam of oscillograph 11 so that sweep line $a$ is not visible; therefore, remote object indications $b$ are only visible on screen 17.

As mentioned heretofore, means are provided by the present invention for facilitating the interpretation of remote object indications $b$ whereby range and direction of remote objects are quickly obtained therefrom with a high degree of accuracy, as well as for readily determining and indicating the range and direction of a pre-selected remote object with a high degree of accuracy, and means for continually and accurately indicating variations in range and direction of a pre-selected remote object. It is contemplated by the present invention to produce a discontinuous circular mark on the viewing screen of the oscillograph, symmetrical with respect to the center of the screen, with means for varying and indicating the radius of the circular mark as a function of range, as well as means for angularly varying and indicating the position of the discontinuous portion of the mark as a function of direction. With the foregoing arrangement, by proper variations of the radius of the circular mark and the angular position of the discontinuous portion thereof, the circular mark may be moved to a position wherein a remote object $b$ is symmetrically positioned within the discontinuous portion. Range and direction of the remote object represented by the indication $b$ is thus directly obtained from suitable indicating means associated with the apparatus. When the range and direction of the remote object varies, the radius and angular position of the discontinuous circular mark is varied to maintain the remote object indication symmetrically positioned within the discontinuous portion whereby continuous indications of range and direction are provided.

In order to produce a calibrating mark of the foregoing character novel means are provided by the present invention for generating a positive impulse which is applied to intensity control grid 21 of oscillograph 11. The generation of such impulses are properly synchronized with the radial propagation of the electron beam, as well as with the rate of pulse generation at transmitter 12, in order to provide indications on screen 17 of a certain range calibration which corresponds to the range calibration of sweep line $a$. The positive impulses are applied to intensity control grid 21 in synchronism with application of saw-tooth current wave forms to deflection coils 16 for a substantially large period of time during each complete revolution of the radially propagating electron beam to thus produce a discontinuous circle on screen 17 upon each complete revolution of antenna 10.

As shown in Fig. 1, the device for generating a positive impulse during the period of each radial propagation of the electron beam includes vacuum tube 30 which is triggered upon application of a positive impulse to the grid thereof from electronic keyer 15 simultaneously with generation of a pulse at transmitter 12. Tube 30 thus generates a negative impulse which is applied to the control grid of vacuum tube 31. Tube 31 is interconnected with vacuum tube 32 to form a multi-vibrator circuit which comprises a two-stage capacitance coupled amplifier with regenerative feedback. When a negative impulse is applied to the control grid of tube 31, the tube is blocked, thus applying a positive bias to the control grid of tube 32, rendering the latter tube conducting and producing a potential drop at the plate thereof. The plate of tube 32 remains at a low potential for a period of time determined by the values of grid resistances 33, 33 and capacitances 34, 34 associated with the control grids of tubes 31 and 32. The negative impulse output of tube 32 is applied to the control grid of vacuum tube 35. Tube 35 is normally maintained in a conducting state by proper selection of plate resistors 36 and grid resistor 37 and is blocked upon application of a negative impulse to the control grid thereof. Capacitance 38 is connected across the plate and cathode of tube 35 and charges exponentially through resistor 36 when tube 35 is in a non-conducting state. The exponentially increasing potential of capacitance 38 is applied through a winding of transformer 40 to the control grid of tube 41. Tube 41 is normally maintained in a non-conducting state and the cut-off potential thereof is varied by means of potentiometer 42 in order to determine the time that tube 41 is rendered conducting following the instant capacitance 38 commences to charge exponentially. For a purpose that will appear more fully hereinafter, potentiometer 42 is adjustable upon manual rotation of dial 43.

Transformer 40 has connections with the plate and control grid of tube 41 in order to function as an oscillating circuit; however, such circuit is suitably damped by resistances 44 and 45 to limit the extent of oscillatory action therein. When the exponentially increasing charge of capacitance 38 reaches a sufficient value to render tube 41 conducting, a negative impulse is generated at the output thereof, and oscillations commence in the oscillatory circuit between the plate and control grid of the tube. Resistances 44 and 45, however, damp such oscillations to only allow generation of a single positive impulse following generation of the negative impulse. The output of tube 41 is connected through condenser 46 to the control grid of amplifier tube 47 which is normally biased in a conducting state. When the negative impulse output of tube 41 is applied to the control grid of tube 47 the latter tube is blocked for an interval of time determined by the duration of the negative impulse, during which time a positive impulse is generated at the output of tube 47. The amplitude of the positive impulse generated at the output of tube 47 is controlled by adjustment of potentiometer device 48. The output of tube 41 is also applied through condenser 49 to the control grid of vacuum tube 50 to re-set the multi-vibrator. When the positive impulse from tube 41 is applied to the grid of tube 50, the tube draws current thus producing a drop in potential at the grid of tube 32, blocking the latter tube. Tube 31 is driven conducting, and the multi-vibrator is thus re-set to a condition responsive to application of the next negative impulse from tube 30.

The positive pulse output of tube 47 is applied to intensity control grid 21 to modulate the intensity of the electron beam at a certain instant during every radial propagation of the electron beam. In order to prevent application of the positive impulses during a certain period of each complete revolution of the radial propagating electron beam to thus produce a discontinuous circular mark on screen 17, suitable switching means are provided for controlling application of the positive impulses to grid 21. Such means comprises a cylindrical member 60, of insulating material, rotatably mounted on shaft 24 for synchronous rotation with antenna 10. A discontinuous circular metallic conductor 61 is imbedded in the outer periphery of member 60 and is electrically connected through suitable slip rings, not shown, to the output of tube 47 by way of electrical conductor 62. Stationary contact 63 is mounted on angular ring 64 and is electrically connected to intensity control grid 21. With the foregoing arrangement, the positive impulse output of tube 47 is applied to intensity control grid 21 only during the time when electrical contact is maintained between conductor 61 and stationary contact 63. Since conductor 61 contacts stationary contact 63 for a greater period during each revolution of shaft 24 the output of tube 47 is applied to intensity control grid 21 during a greater portion of each complete revolution of shaft 24. A discontinuous circular calibration mark is thus produced on screen 17 for each complete revolution of antenna 10. The angular portion of the discontinuous portion thereof is determined by the angular position of stationary contact 63. Annular member 64 is provided with an annular gear 65, on the outer periphery thereof, which cooperates with pinion 66 whereby the annular position of stationary contact 63 is varied upon manual rotation of pinion 66 through control dial 67 to vary the angular position of the discontinuous portion of the circular mark.

As mentioned heretofore, since the range of remote objects is determined by the radial distance of indications b from the center of the screen 17, and since the direction of such objects is determined from the angular position of the indications, the novel arrangement disclosed herein provides means for determining the range and direction of remote objects from such indications with a high degree of accuracy. Capacitances 38, as well as the circuit constants associated therewith, are selected so that the rate of exponential charge on the capacitance corresponds to the linearly increasing portion of the saw-tooth wave forms applied to deflection coils 16, and is therefore, at all times, equal to the rate of radial propagation of the electron beam of the oscillograph. The pulses produced at the output of tube 47, and consequently the discontinuous circular mark produced on screen 17, is therefore synchronously calibrated in range with the remote object indications b. Since the time of generation of the pulse output of tube 47, following initiation of the radial scanning of the electron beam, is varied upon operation of potentiometer 42, through dial 43, dial 43 is calibrated in range so that the radial positions of the positive pulse, with respect to the radial scanning time of the electron beam, is determined as a function of range from dial 43. Moreover, since member 60 rotates in synchronism with rotation of antenna 10, dial 67 is calibrated in degrees so that various angular positions of the discontinuous portion of the circular mark on screen 17 are accurately determined therefrom.

When utilizing a device having the foregoing characteristics for accurately determining range and direction of a remote object from an indication b on screen 17, dial 43 is operated to vary the radius of the discontinuous concentric calibration mark in order to coincide with the radial distance of the indication, while dial 67 is rotated to angularly vary the position of the discontinuous portion until the remote object indication b is symmetrically located within such portion, as shown in Fig. 2 of the drawing. The range and direction of the remote object corresponding to such indication is then directly read from dials 43 and 67 with a high degree of accuracy. Variations in range and direction of the remote object is readily obtained by proper operation of dials 43 and 67 to maintain a remote object indication b symmetrically within the discontinuous portion of the circular mark.

There is thus provided by the present invention novel means for facilitating the interpretation of indications produced by radio echo ranging devices or similar apparatuses of the type disclosed herein. Means are provided by the present invention for producing direct indications of range and direction of a remote object from the indication thereof produced on the indicator of the apparatus. Such means is capable of producing continuous indications of range and direction of a pre-selected remote object, with a high degree of accuracy, when such object varies in range and direction to any position about the apparatus.

Although one embodiment of the present invention has been disclosed and described herein, it is to be expressly understood that various changes and substitutions may be made therein without departing from the spirit of the invention as well understood by those skilled in the art. Reference therefor will be had to the appended claims for a definition of the limits of the invention.

This application is a continuation of application Serial Number 441,732, filed May 4, 1942, and now abandoned.

The invention described herein may be manufactured and used by or for the Government of the United States of America for governmental purposes without the payment of any royalties thereon or therefor.

What is claimed is:

1. A cathode ray indicator comprising a cathode ray tube having means for generating a beam and an indicator screen for receiving the beam, sweep means for deflecting the beam radially of the screen, sweep control means operative to control the direction of the radial sweep, beam control signal generator means operative to modulate the beam intensity to provide a reference indication on the radial sweep, and variable time delay means becoming operative in definite time relation with the sweep means to initiate operation of the signal generator means to provide a reference indication on the radial sweep.

2. A cathode ray indicator comprising a cathode ray tube having means for generating a beam and an indicator screen for receiving the beam, sweep means for deflecting the beam radially of the screen, sweep initiating means for initiating operation of the sweep means, signal generator means operative to modulate the beam intensity, variable time delay control means becoming operative synchronously with the sweep initiating means to initiate operation of the signal generator in definite time relation with the sweep after a selected time delay interval, and means for controlling the direction of the radial sweep.

3. A cathode ray indicator comprising a cathode ray tube having means for generating a beam and an indicator screen for receiving the beam, sweep means for deflecting the beam radially of the screen, rotatable sweep control means operative to control the direction of the radial sweep, beam modulation means, and signal generator means feeding the beam modulation means at an adjustably selectable position of the rotatable sweep control means to modulate the beam.

4. A cathode ray indicator comprising a cathode ray tube having means for generating a beam and an indicator screen for receiving the beam, sweep means for deflecting the beam radially of the screen, continuously operative rotatable sweep control means for rotating the direction of the radial sweep, beam modulation means, signal generator means for feeding the beam modulation means, and control means for the signal generator means operative synchronously with the rotatable sweep control means to effect application of the signal generator output to the beam modulation means at an adjustably selectable position of the sweep control means.

5. A cathode ray indicator comprising a cathode ray tube having means for generating a beam and an indicator screen for receiving the beam, means for sweeping the beam radially of the indicator screen in a locus progressively advancing around the screen and beam modulation means operative to establish a reference indication on the indicator screen at an adjustably selectable radial position thereon.

6. A cathode ray indicator comprising a cathode ray tube having means for generating a beam and an indicator screen for receiving the beam, means for sweeping the beam radially of the indicator screen in a locus progressively advancing around the screen, and beam modulation means operative to effect the application of a reference indication at an adjustably selectable orientation of the radial sweep.

7. A cathode ray indicator comprising a cathode ray tube having means for generating a beam and an indicator screen for receiving the beam, means for sweeping the beam radially of the indicator screen in a locus progressively advancing around the screen, and beam modulation means operative to effect the application of a reference indication at an adjustably selectable radial position and an adjustably selectable radial direction on the screen.

8. A cathode ray indicator comprising a cathode ray tube having means for generating a beam and an indicator screen for receiving the beam, means for recurrently sweeping the beam over adjacent trace lines to define a two-dimensional sweep area on the screen, and adjustable beam modulation means operative to establish a reference indication in any selected portion of the sweep area.

MILLARD S. McVAY.
JOHN H. GREIG.

REFERENCES CITED

The following references are of record in the file of this patent:

UNITED STATES PATENTS

| Number | Name | Date |
|---|---|---|
| 2,121,359 | Luck et al. | June 21, 1938 |
| 2,178,074 | Jakel et al. | Oct. 31, 1939 |
| 2,241,809 | De Forest | May 13, 1941 |
| 2,280,524 | Hansen | Apr. 21, 1942 |
| 2,284,219 | Loughren | May 26, 1942 |
| 2,307,237 | Rea et al. | Jan. 5, 1943 |
| 2,313,966 | Poch | Mar. 16, 1943 |
| 2,403,278 | Hershberger | July 2, 1946 |
| 2,406,970 | Smith | Sept. 3, 1946 |
| 2,408,039 | Busignies | Sept. 24, 1946 |
| 2,468,032 | Busignies | Apr. 26, 1949 |